United States Patent [19]

Basile

[11] 4,050,182
[45] Sept. 27, 1977

[54] BOOK NET FOR CRABS, LOBSTERS, AND THE LIKE

[76] Inventor: Jerry Basile, 1840 67th St., 2nd Floor, Brooklyn, N.Y. 11204

[21] Appl. No.: 762,039

[22] Filed: Jan. 24, 1977

[51] Int. Cl.² ............................................. A01K 69/10
[52] U.S. Cl. ....................................................... 43/105
[58] Field of Search ............................ 43/102, 105, 63

[56] References Cited
U.S. PATENT DOCUMENTS

| | | | |
|---|---|---|---|
| 390,218 | 10/1888 | Flick | 43/105 |
| 957,618 | 5/1910 | Masek | 43/105 |
| 1,262,507 | 4/1918 | Johnston | 43/105 |

Primary Examiner—Warner H. Camp
Attorney, Agent, or Firm—Richard L. Miller

[57] ABSTRACT

A trap for catching crabs or other crawling underwater animals; the trap including a pair of frames hinged to upstanding portions of a central frame, each hinged frame being fitted with a rope net, and the hinged frames are spring biased to a set position resting spread open on a bottom of a water so a crab or animal can walk thereupon to reach bait on a rod mounted between the upstanding portions of the central frame, after which the free ends of the hinged frames are pivoted upwardly by a tethering line so to trap the animal between the hinged frames, the trap then being pulled up out of the water.

1 Claim, 5 Drawing Figures

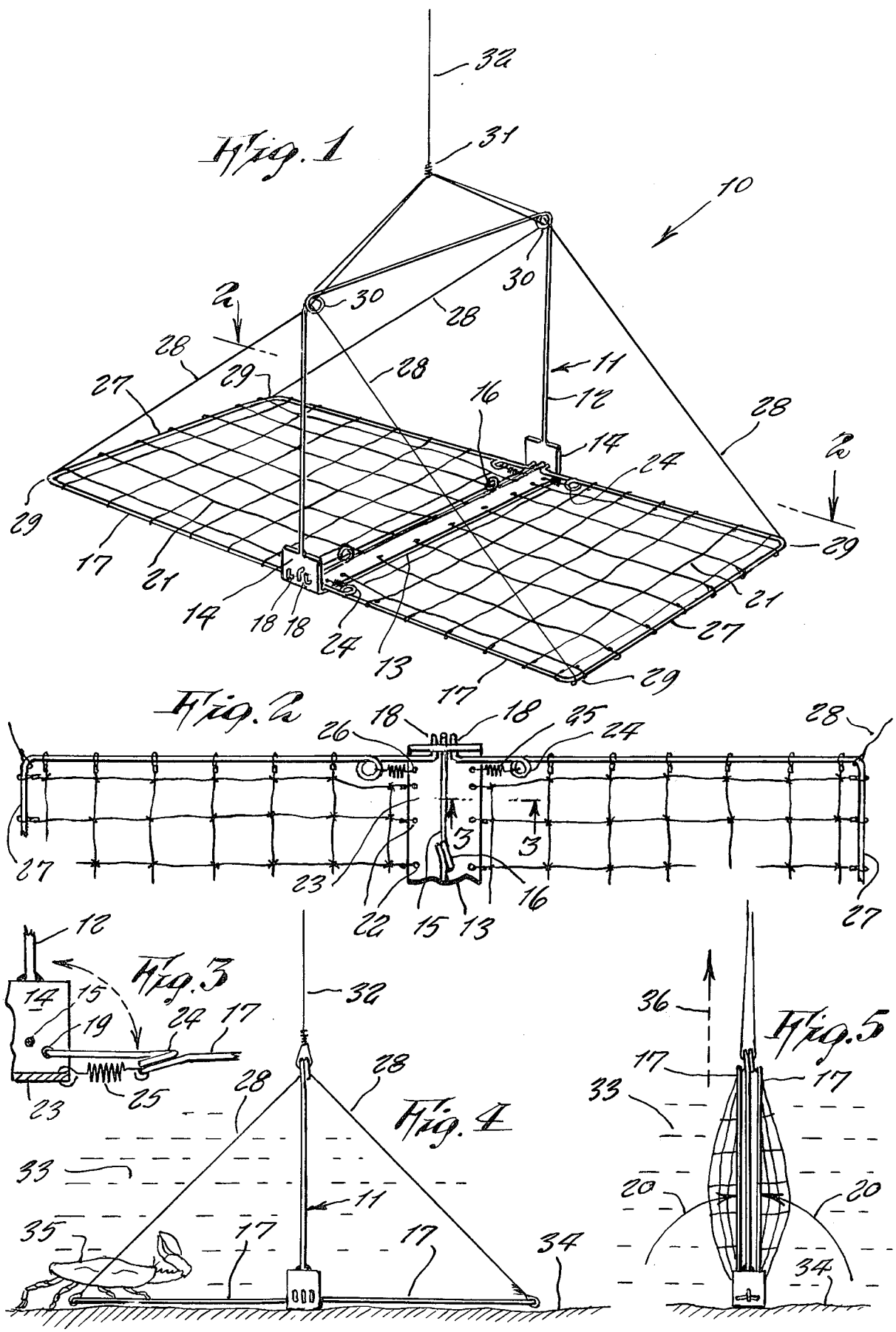

BOOK NET FOR CRABS, LOBSTERS, AND THE LIKE

This invention relates generally to animal traps. More specifically, it relates to a trap for catching crabs, lobsters, or the like.

A principal object is to provide a trap of book-shape fitted with nets and which can be easily lowered down to a bottom of a water where it automatically spreads open in a set position to catch an animal crawling thereupon and which then, by pulling a tethering line, closes around the animal capturing it.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown in set up position so to catch a crab.

FIG. 2 is a fragmentary view thereof on line 2—2 of FIG. 1.

FIG. 3 is an enlarged cross-section on line 3—3 of FIG. 2.

FIG. 4 is a side view of the device shown set up with crab entering.

FIG. 5 is a similar view shown pulled closed thus catching the crab.

Referring now to the drawings in greater detail, the reference numeral 10 represents a Book Net according to the present invention wherein the same includes a central rectangular frame 11 comprised of a stiff U-shaped wire 12 and a stiff, U-shaped flat strip 13 enjoined together at their ends. Parallel turned opposite ends 14 of strip 13 support a straight wire rod 15 therebetween, the rod having two bent up loops 16 to which bait can be attached. A pair of U-shaped frames 17 made of stiff wire are each bent with a double right angle offset 18 at each opposite end and fitted through one of a pair of openings 19 in each end 14 of the strip. One of the frames 17 is on each side of the central frame 11 and is pivotable in openings 19 between the positions shown in FIGS. 4 and 5 and as indicated by arrows, 20.

Each frame 17 has a loosely fitted rope net 21 thereupon, one side of the net being attached to openings 22 along a side 23 of the strip 13.

A loop 24 formed near each opposite end of each frame 17 is attached to one end of a tension coil spring 25 which at its other end is attached to opening 26 on the strip intermediate side 23; the springs normally maintaining the frames in a spread apart position as shown in FIG. 4.

The free ends 27 of each frame 17 is connected to a pair of nylon lines 28 at each corner 29; each line being passed through a loop 30 formed at opposite corners of the central frame 11, the four lines 28 then being attached to one end 31 of a long, nylon tethering line 32 which at its other end is held by a fisherman.

In use of the device, after being baited, it is lowered in the water 33 until it rests upon a bottom 34. The frames 17 are spread apart in a horizontal position by means of springs 25 while the central frame 11 is thus held vertical. A crab 35 attracted by the bait crawls upon the spread open frames and their nets. The fisherman seeing the crab in this position, then pulls on the tethering line as indicated by arrow 36, thus pivoting the frames 17 together and thus enclosing the crab between the nets of the frames. Further pulling of the tethering lines lifts the trap out of the water for removal of the caught crab.

While certain novel features of this invention have been shown and described and are pointed out in the annex claims, it will be understood that various omissions, substitutions and changes in the forms and details of the device illustrated and in its operation can be made by those skilled in the art without departing from the spirit of the invention.

What is claimed is:

1. A book-net for catching crabs, lobsters and the like, comprising in combination, a central frame and a pair of pivotable frames, one of which is positioned adjacent each side of said central frame and both said pivotable frames being pivotable about one end of said central frame so to be provided between said position adjacent said central frame and a spread apart position 90 degrees away therefrom so that said pivotable frames are both on a common plane at right angles to said central frame, all said frames being made of a stiff material, said pivotable frames each having a loosely fitted rope net; spring means normally maintaining said pivotable frames in said spread apart position; a pair of nylon lines each having their opposite ends attached to opposite corners of a free end of each said pivotable frame and an intermediate portion of said nylon line extending through a loop at each corner of a free end of said central frame, while a center of each said nylon lines are attached to one end of a tethering line which at its other end can be held by a fisherman; said central frame being comprised of a U-shaped wire having said loops at its corners, and a U-shaped flat strip wherein bent over opposite flat ends are affixed to the opposite ends of said wire, said flat ends having bearings openings receiving opposite ends of said pivotable frames, and said flat ends also supporting a wire rod between said frames having bent up loops to which bait is attachable.

* * * * *